United States Patent [19]

Anderson et al.

[11] Patent Number: 4,644,527
[45] Date of Patent: Feb. 17, 1987

[54] INTERFACE UNIT FOR TRANSFERRING VOICE AND DATA SIGNALS

[75] Inventors: Thomas W. Anderson; Radha K. Avva, both of Naperville, Ill.; Bruce T. Forrest, Fairfax, Va.; Zbigniew A. Krawiec, Aurora, Ill.; William R. Starrett, Lincroft, N.J.

[73] Assignee: AT&T Bell Laboratories, Murray Hill, N.J.

[21] Appl. No.: 728,286

[22] Filed: Apr. 29, 1985

[51] Int. Cl.[4] .................. H04Q 11/04; H04J 3/12
[52] U.S. Cl. .................................... 370/58; 370/110.1
[58] Field of Search .......................... 370/58, 110.1; 179/20 P

[56] References Cited
U.S. PATENT DOCUMENTS

| 4,442,540 | 4/1984 | Allen | 381/31 |
| 4,476,559 | 10/1984 | Brolin et al. | 370/110.1 |
| 4,491,944 | 1/1985 | Caizergues et al. | 370/58 |
| 4,550,404 | 10/1985 | Chodrow et al. | 370/110.1 |
| 4,578,787 | 3/1980 | Middleton et al. | 370/58 |

Primary Examiner—Douglas W. Olms
Assistant Examiner—Frank M. Scutch, III
Attorney, Agent, or Firm—Richard J. Godlewski

[57] ABSTRACT

Disclosed is a switching system for pooling a predetermined number of pairs of individual voice and individual data signal lines to serve on a demand basis a greater number of lines that simultaneously transfer voice and data signals. Each pair of lines includes a line for transferring a voice signal and another line for transferring a data signal. The switching system includes a plurality of interface units each coupled to a pair of lines for transferring a voice signal between the individual voice signal line in the coupled pair of lines and a simultaneous voice and data signals line interconnected with the interface unit. Each unit also transfers a data signal between the individual data signal line in the coupled pair and the interconnected simultaneous voice and data signals line. The switching system also includes a switching network for interconnecting an interface unit and a simultaneous voice and data signals line requesting service.

22 Claims, 7 Drawing Figures

INTERFACE UNIT FOR TRANSFERRING VOICE AND DATA SIGNALS

TECHNICAL FIELD

This invention relates generally to telecommunications equipment and, more particularly, to an interface unit for use in a switching system to transfer voice and data signals between a pair of individual voice and individual data signal lines and a simultaneous voice and data signals line.

BACKGROUND OF THE INVENTION

In the prior art, when telecommunication customers each with, for example, a telephone and a data terminal wanted both voice signal and data signal transmission capability, two separate two-wire communication lines were required to serve each customer. One two-wire line transfers the voice signals, and the other two-wire line with a data set(multiplexer-demultiplexer) at each end of the line transfers the data signals. However, many voice signal switching systems have a limited bandwidth and are unable to pass the data signals. Consequently, a data signal switching system typically switches the data lines, and a separate voice signal switching system switches the voice signal lines. The problem with this arrangement is that two two-wire lines, one with two data sets, for each customer and two switching systems are required to provide customers with both simultaneous and independent voice signal and data signal transmission capability.

Another prior art arrangement utilizes a data set at each end of a single two-wire line for each customer to simultaneously and independently transfer voice and data signals. The data set frequency multiplexes the voice and the data signals at the customer end of the line and demultiplexes the signals at the other end of the line before the separated voice signal is sent to a voice signal switching system. The separated data signal is typically sent to a computer port that is connected to the data signal line on a dedicated basis. The problem with this second arrangement is that a line with two data sets and a computer port for each customer and a voice signal switching system are still required. Depending on the number of data signal lines and the actual use of each line, the cost of a large number of computer ports with low utilization can be enormous.

SUMMARY OF THE INVENTION

The aforementioned problems are solved and a technical advance is achieved by an interface unit for transferring voice and data signals between a simultaneous voice and data signals line and a pair of individual voice and individual data signal lines. By way of example, a plurality of these units may be used in a switching system for pooling a predetermined number of pairs of individual voice and individual data signal lines to serve a greater number of simultaneous voice and data signals lines. Each pair of lines includes a line for transferring a voice signal and another line for transferring a data signal. The interface unit includes a multiplexer for transferring a voice signal between the voice signal line in a pair of lines and a simultaneous voice and data signals line and a data signal between the data signal line in the pair of lines and the simultaneous voice and data signal line. Also included in the unit is a circuit for interconnecting the multiplexer and the simultaneous voice and data signals line.

In accordance with one feature of the invention, the interface unit further includes means for interconnecting the multiplexer and the voice signal line in the pair of lines.

In accordance with still another feature of the invention, the interface unit further includes means for interconnecting the data signal line in the pair of lines and another data signal line.

In accordance with another feature of the invention, the interface unit further includes means for detecting the state of the voice signal line in the pair of lines and means for detecting the state of the data signal line in the pair of lines wherein the voice and the data signal lines in the pair of lines each has a plurality of states.

In accordance with yet another feature of this invention, a plurality of interface units each coupled to a pair of individual voice and individual data signal lines are included in a switching system for pooling a predetermined number of pairs of individual voice and individual data signal lines to serve a greater number of simultaneous voice and data signals lines. Also included in the switching system is a switching network for interconnecting a unit in the plurality of interface units and a simultaneous voice and data signals line requesting service.

In accordance with one feature of the invention, the switching system includes a control unit responsive to an access code received from the requesting simultaneous voice and data signals line for generating a control signal. Each of the interface units has an access code. The network is responsive to the control signal for interconnecting the requesting simultaneous voice and data signals line and an interface unit having the received access code.

In accordance with still another feature of the invention, the control unit is further responsive to routing information such as the telephone number of another voice signal line received from the requesting simultaneous voice and data signals line for generating a second control signal. The network is further responsive to the second control signal for interconnecting the voice signal line in the pair of lines coupled to the interconnected interface unit and another voice signal line indicated by the routing information.

In accordance with yet another feature, the interconnected interface unit includes a multiplexer for transferring the voice signal between the voice signal line in the pair of lines coupled to the interconnected interface unit and the interconnected requesting simultaneous voice and data signals line and the data signal between the data signal line in the pair of lines coupled to the interconnected interface unit and the interconnected requesting simultaneous voice and data signals line.

In accordance with still yet another feature, the interconnected interface unit further includes means for interconnecting the multiplexer and the interconnected requesting voice and data signals line.

In accordance with another feature, the interconnected interface unit further includes means for interconnecting the multiplexer and the voice signal line in the pair of lines coupled to the interconnected interface unit.

In accordance with still another feature of this invention, the data signal line in the pair of lines coupled to the interconnected interface unit has a plurality of states. The interconnected interface unit includes means interrogatable by the control unit for detecting the state of the data signal in the pair of lines coupled to the interconnected interface unit.

In accordance with yet another feature, the voice signal line in the pair of lines coupled to the interconnected interface unit has a plurality of states. The interconnected interface unit includes means interrogatable by the control unit for detecting the state of the voice signal line in the pair of lines coupled to the interconnected interface unit.

In accordance with still yet another feature of the invention, the control unit is further responsive to routing information received from the requesting simultaneous voice and data signals line for generating a second control signal. The network is responsive to the second control signal for interconnecting the data signal line in the pair of lines coupled to the interface unit having the received access code and another data signal line indicated by the routing information.

In accordance with another feature of the invention, the control unit is further responsive to the received routing information for generating a service request signal. The interconnected interface unit further includes means responsive to the service request signal from the control unit for requesting service on the data signal line in the pair of individual lines coupled to the interconnected interface unit.

In accordance with still another feature of this invention, the interconnected interface unit having the received access code includes a multiplexer for transferring the voice signal between the voice signal line in the pair of lines coupled to the interconnected unit and the requesting simultaneous voice and data signals lines. The multiplexer also transfers the data signal between the data signal line in the pair of lines coupled to the interconnected interface unit and the requesting simultaneous voice and data signals line. In addition, the interconnected interface unit includes means for interconnecting the multiplexer and the interconnected requesting simultaneous voice and data signals line. The interconnected interface unit further includes means for interconnecting the multiplexer and the voice signal in the pair of lines coupled to the interconnected interface unit.

In accordance with yet another feature, the data signal in the pair of lines coupled to the interconnected interface unit has a plurality of states. The interconnected interface unit includes means interrogatable by the control unit for detecting the state of the data signal line.

In accordance with still yet another feature of the invention, the voice signal in the pair of lines coupled to the interconnected interface unit has a plurality of states. The interconnected interface unit includes means interrogatable by the control unit for detecting the state of the voice signal line.

In accordance with another feature, the control unit is further responsive to second routing information received from the requesting simultaneous voice and data signals line for generating a third control signal. The network is responsive to this third control signal for interconnecting the voice signal line in the pair of lines coupled to the interconnected interface unit and another voice signal line indicated by the second routing information.

BRIEF DESCRIPTION OF THE DRAWING

The invention may be better understood from the following detailed description when read with reference to the drawing in which.

DETAILED DESCRIPTION

Figure 1:
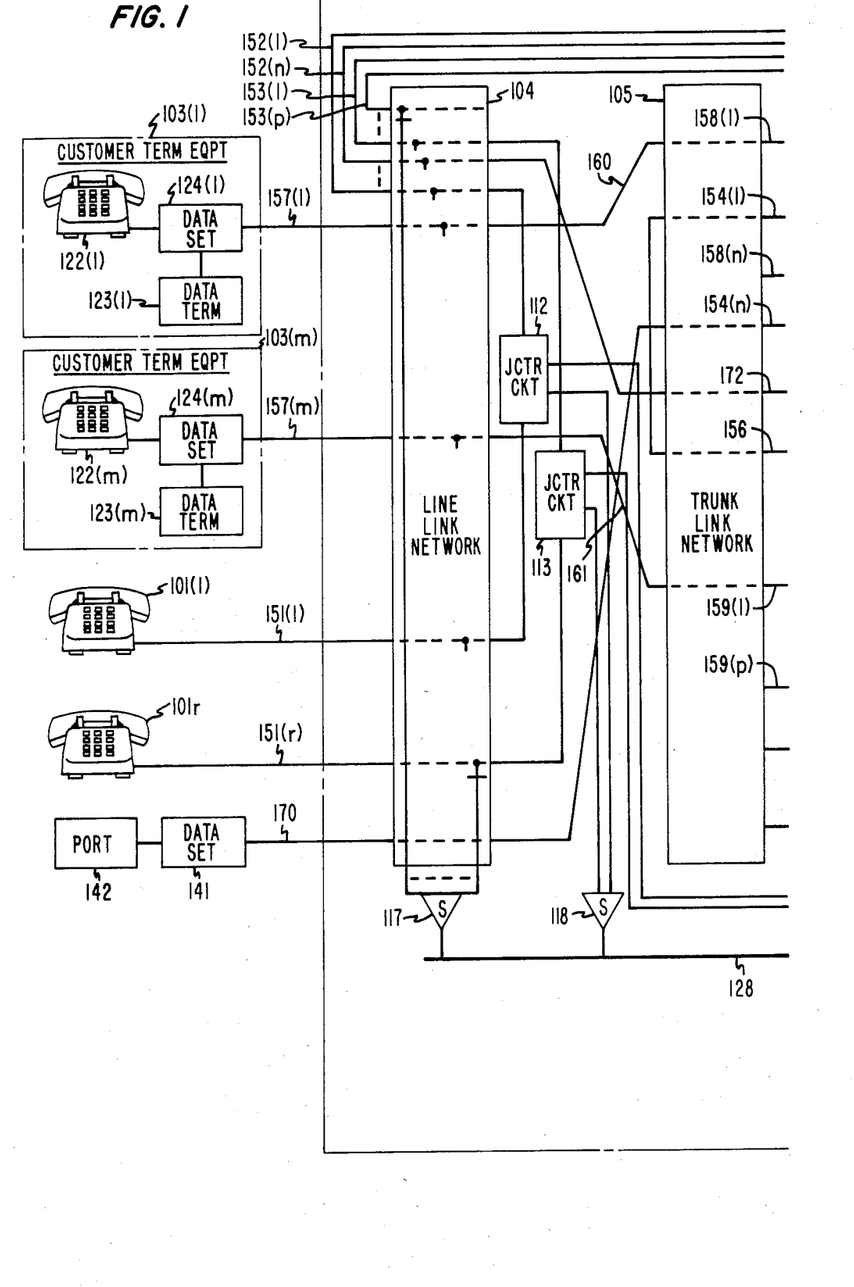
FIGS. 1, 5, and 6 depict a block diagram of an illustrative switching system for pooling a predetermined number of pairs of individual voice and individual data signal lines to serve a greater number of simultaneous voice and data signals lines.
Figure 5:
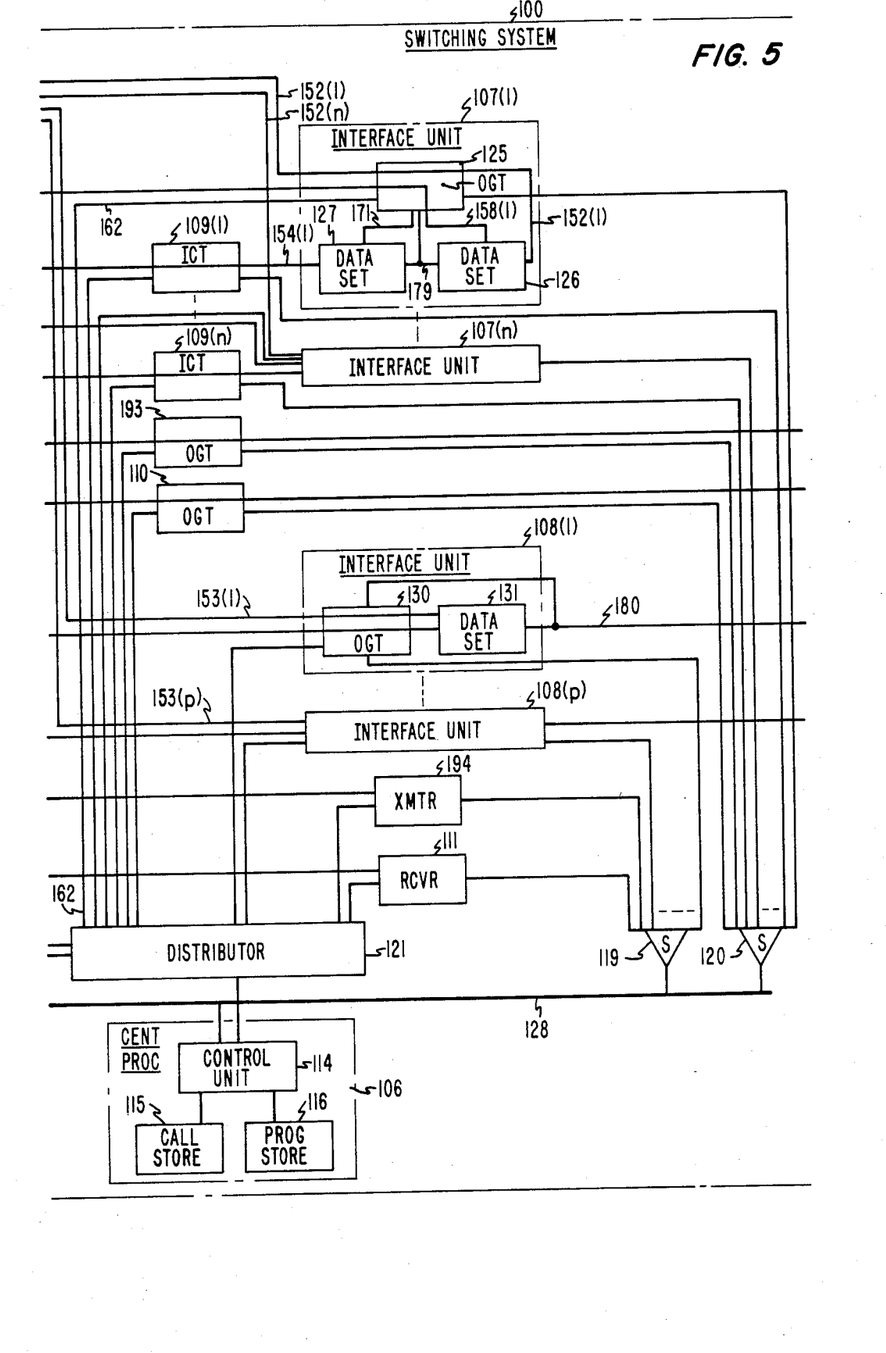
Figures 6, 7:
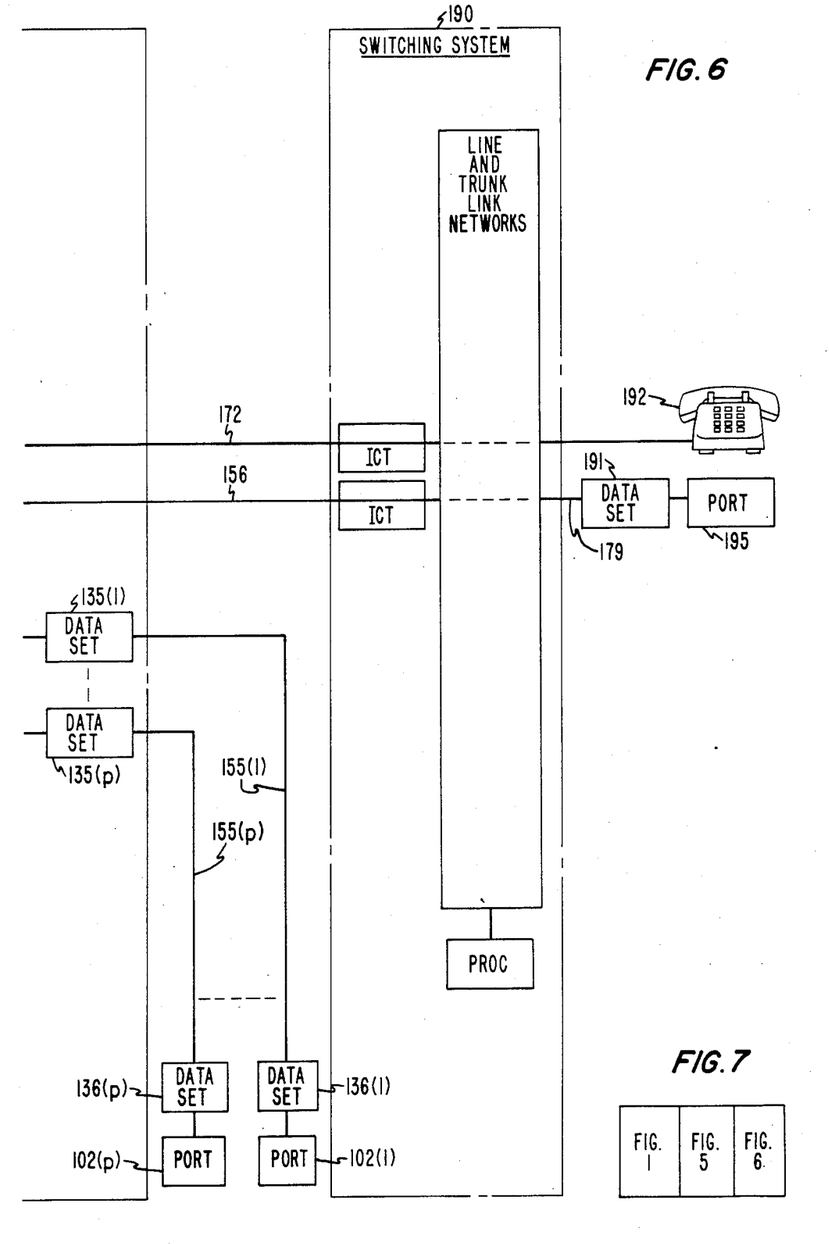
FIG. 7 illustrates the combination of FIGS. 1, 5 and 6.

FIGS. 1, 5, and 6 depict an illustrative switching system 100 for pooling a predetermined number of pairs of communication lines 152(1), 154(1); . . . ; 152(n), 154(n) and 153(1), 155(1); . . . ; 153(p), 155(p) to serve on a demand basis a greater number of two-wire communication lines 157(1)–157(m) that simultaneously and independently transfer voice and data signals. Each pair of lines such as 152(1), 154(1) includes a two-wire line 152(1) for transferring a voice signal and another two-wire line 154(1) for transferring a data signal.

System 100 serves various customers with different types of customer terminal equipment such as telephones 101(1)–101(r), computer ports 102(1)–102(p), and simultaneous voice and data signals equipment 103(1)–103(m) terminating communication lines 151(1)–151(r), 155(1)–155(p), and 157(1)–157(m), respectively. The system also includes line and trunk link networks 104 and 105 and interface units 107(1)–107(n) and 108(1)–108(p) under the control of central processor 106. Interface units 107(1)–107(n) and 108(1)–108(p) are connected to trunk link network 105 via two-wire simultaneous voice and data signals lines 158(1)–158(n) and 159(1)–159(p), respectively. Interface units 107(1)–107(n) and 108(1)–108(p) are also coupled to one end of communication line pairs 152(1), 154(1); . . . ; 152(n), 154(n) and 153(1), 155(1); . . . ; 153(p), 155(p), respectively. The variables m, n, p, and r are integers.

Each interface unit transfers voice signals between the voice signal line in the coupled pair of lines and the connected simultaneous voice and data signals line and also simultaneously transfers data signals between the data signal line in the coupled pair and the connected simultaneous voice and data signals line. Responsive to control signals from central processor 106, line and trunk link networks 104 and 105 selectively interconnect on a demand basis the larger number of simultaneous voice and data signals lines 157(1)–157(m) with the smaller number of simultaneous voice and data signals lines 158(1)–158(n) or 159(1)–159(p). As a result, each interface unit can also transfer voice and data signals between the pair of coupled lines and a simultaneous voice and data signals line interconnected by the networks.

The data signal line in each pair of lines coupled to interface units 107(1)-107(n) is switched through the networks and selectively interconnected with communication lines such as 156 and 170 to host computer ports 195 and 142. As shown, data signal lines 154(1)-154(n) are connected on one end to trunk link network 105 and coupled on the other end to interface units 107(1)-107(n) through well-known incoming trunk circuits 109(1)-109(n), respectively.

The data signal line in each pair of lines coupled to interface units 108(1)-108(p) is dedicated to a port in respective computer ports 102(1)-102(p). Well-known central office computer port data sets 135(1)-135(p) and host computer port data sets 136(1)-136(p) terminate the opposite ends of data signal lines 155(1)-155(p), respectively.

As previously suggested, interface units 107(1)-107(n) and 108(1)-108(p) are coupled to one end of respective voice signal lines 152(1)-152(n) and 153(1)-153(p). The other end of these voice signal lines terminates on line link network 104 for interconnection to other voice signal communication lines such as voice signal lines 151(1)-151(r) terminated by respective telephones 101(1)-101(r) or interoffice lines such as 172 to telephone 192 that is served by switching system 190.

Each of two-wire lines 157(1)-157(m) is terminated with well-known respective customer terminal equipment 103(1)-103(m) for simultaneously and independently transferring voice and data signals thereon. Customer terminal equipment 103(1)-103(m) comprises telephones 122(1)-122(m), data terminal 123(1)-123(m), and customer premises terminal data sets 124(1)-124(m), respectively.

Thus, switching system 100 can establish separate voice and data calls to different locations with a limited number of pairs of individual voice and individual data signal lines to serve a greater number of simultaneous voice and data signals lines on a demand basis.

Each of switching systems 100 and 190 is an electronic program-controlled switching system of the type disclosed in U.S. Pat. No. 3,570,008 issued Mar. 9, 1971, to R. W. Downing et al. and also disclosed in *The Bell System Technical Journal,* Volume 43, No. 5, Parts 1 and 2, Sept. 1964. These citations may be referred to for a more comprehensive understanding of the construction and operation of an electronic program-controlled switching system.

Line link network 104 terminates communication lines 151(1)-151(r), 152(1)-152(n), 153(1)-153(p), 157(1)-157(m), and 170. Trunk link network 105 terminates interface units 107(1)-107(n) via well-known respective incoming trunk circuits 109(1)-109(n) and respective communication lines 154(1)-154(n). Trunk link network 105 terminates interface units 108(1)-108(p) and well-known outgoing trunk circuits 110 and 193 via communication lines 159(1)-159(p), 156 and 172, respectively. Network 105 also terminates digit receivers such as 111, digit transmitters 194, and other miscellaneous circuits which have not been shown to simplify the drawing. Networks 104 and 105 are interconnected via well-known wire junctors such as 160 and 161 to permit the interconnection of communication lines, customer terminal equipment, interface units, trunk circuits, and service circuits for call processing under the control of processor 106. Network 104 is also interconnected by junctor circuits such as 112 and 113 to complete and supervise intraoffice calls between lines such as lines 151(1) and 152(1) and lines 151(r) and 153(1).

The majority of the control, supervisory, and translation functions required for the operation of this system are performed by central processor 106. A typical central processor suitable for use in the illustrative switching system is described in *The Bell System Technical Journal,* Volume 56, No. 2, Feb., 1977. Processor 106 is a data processing facility and can be functionally divided into control unit 114, call store 115, and program store 116 plus maintenance apparatus which has not been shown to simplify the drawing.

Call store 115 is a memory for storing translation and routing information in addition to temporary information for calls in progress and special services.

Program store 116 is a memory for storing the program instructions which direct the control unit to sequentially form its many functions.

Control unit 114 is the information processing unit of the system and executes the program instructions stored in program store 116 using information temporarily stored in call store 115. In response to access codes and routing information received from customer terminal equipment, control unit 114 also generates network control signals. Networks 104 and 105 use these network control signals to establish interconnections between specified communication lines, terminal equipment, and interface units, in a well-known manner.

Processor 106 interfaces with the various communication lines, trunk circuits, interface units, and service circuits via scanners 117-120 and distributor 121. Distributor 121 responds to orders over bus system 128 from the control unit to apply pulses to distribution points connected to the various units of equipment. For example, in response to an appropriate order, distributor 121 sends a signal via a conductor in bundle 162 to actuate apparatus such as a relay in interface unit 107(1). In addition, distributor 121 applies pulses to digit transmitter 194 to send digits to, for example, switching system 190.

Scanners 117-120 are used to gather information for the control unit by monitoring conductors connected to the various units of equipment and communication lines. Thus when a trunk circuit such as incoming trunk circuit 109(1) changes state as a result of a seizure signal from interface unit 107(1), a corresponding signal is transmitted to scanner 120 and then reported to control unit 114. Similarly, scanner 119 recognizes changes of state in digit receiver 111 in order to ascertain digits received from communication lines. Likewise, scanners 117 and 118 are used to recognize the busy/idle (offhook/on-hook) condition of communication lines 151(1)-151(r) and 157(1)-157(m) and junctor circuits 112 and 113. Periodically, all of the scanners are addressed by control unit 114 over bus system 128 to determine the state of the various units of equipment and the communication lines.

To send voice and data signals simultaneously on a single two-wire communication line such as 157(1), telephone 122(1) and data terminal 123(1) are connected to commercially available customer premises terminal data set 124(1) such as the M-823 station unit manufactured by the Teltone Corporation. Customer data set 124(1) is a 9600 bps limited distance multiplexer-demultiplexer that provides simultaneous and independent voice and data transmission in a full duplex mode. On line 157(1), the customer data set simultaneously transmits voice signals and a data carrier signal at a frequency above the voice signal frequencies and receives voice signals and data carrier signal at a different frequency also above the voice signal frequencies. The data set has a standard RS232C interface to data terminal 123(1) and a two-wire connection to telephone 122(1).

Each of interface units 107(1)–107(n) includes an outgoing trunk circuit 125, office terminal data set 126, and office computer port data set 127 interconnected as shown.

Figure 2:
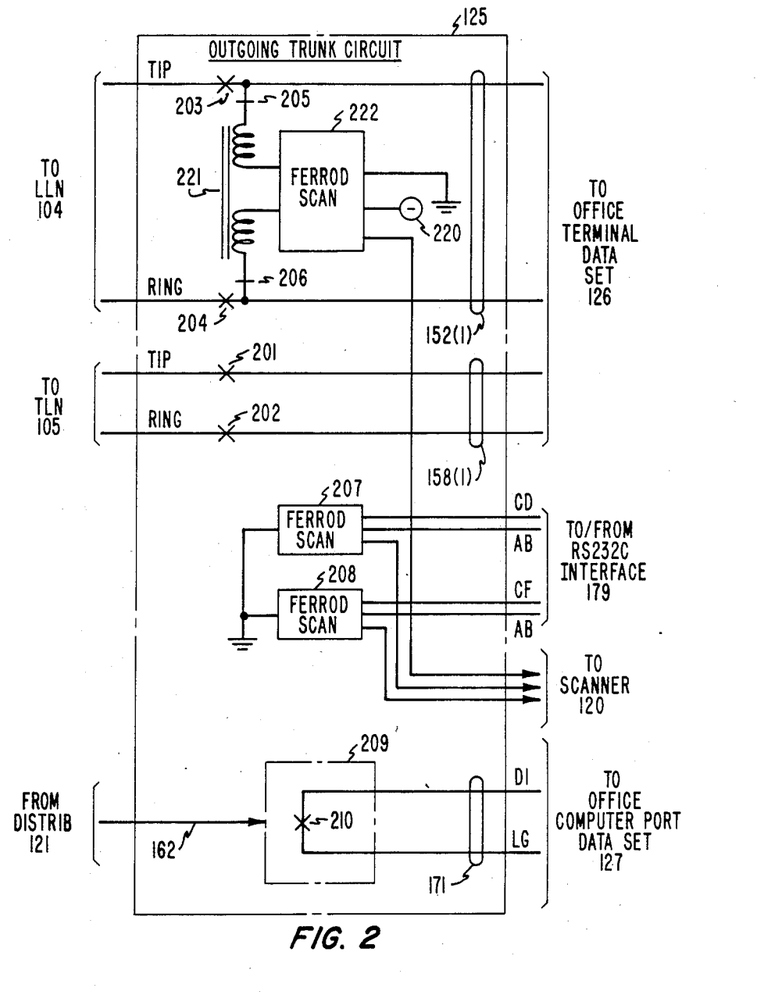
FIG. 2 shows a block diagram of an outgoing trunk circuit in an interface unit in the switching system of FIG. 1.

Depicted in FIG. 2 is a block diagram of outgoing trunk circuit 125 which provides office terminal data set 126 a trunk link network appearance via simultaneous voice and data signals line 158(1) and a line link network appearance via voice signal line 152(1). Well-known "make" contacts 201 and 202 interconnect the respective tip and ring leads of two-wire communication line 158(1) as it passes through the trunk circuit. "Make" contacts 201 and 202 are part of a relay (not shown) that is operated under the control of control unit 114 via distributor 121 in a well-known manner. Similarly, "make" contacts 203 and 204 interconnect the respective tip and ring leads of two-wire line 152(1) as it passes through the trunk circuit. "Make " contacts 203 and 204 of a second relay (not shown) are also operated under the control of control unit 114.

The tip and ring leads of communication line 152(1) are also connected to ground and negative potential source 220 such as −48 volts through "break" contacts 205 and 206 of the second relay, battery feed inductor 221, and well-known ferrod scan point 222 as shown. Scan point 222 detects the supervisory state of the interconnected simultaneous voice and data signals line such as 157(1) for an on-hook condition after a data call to a host computer port has been established via incoming trunk circuit 109(1). The scan point is interrogated to report the receipt of an on-hook condition to control unit 114 via scanner 120 in a well-known manner. When the second relay is operated, scan point 222 is disconnected from the line, and the office terminal data set is connected to the line link network appearance.

Ferrod scan point 207 detects the state of the data signal line by monitoring the data carrier signal from the customer premises terminal data set such as 124(1) to a host computer port data set such as 191 shown in FIG. 1. This data carrier signal is monitored via the well-known CD and AB leads of RS232C interface 179 between office terminal data set 126 and office computer port data set 127. The saturation of ferrod scan point 207 indicates the presence of a data carrier signal to the host computer data set and is reported to control unit 114 via scanner 120.

Ferrod scan point 208 also detects the state of the data signal line by monitoring the data carrier signal from host computer port data set 191 to customer terminal data set 124(1). Scan point 208 is connected to the well-known CF and AB leads of RS232C interface 179. The saturation of scan point 208 indicates the presence of a data carrier signal from the host computer port data set to the customer terminal data set and is likewise reported to control unit 114 via scanner 120.

Also included in outgoing trunk circuit 125 is relay 209 with "make" contact 210 for interconnecting the LG and D1 control leads in conductor pair 171 to office computer port data set 127. Office computer port data set 127 sends an off-hook seizure signal to the connected incoming trunk circuit such as 109(1) when the leads in conductor pair 171 to office computer port data set 127 are interconnected. Relay 209 is, of course, operated under the control of control unit 114 via distributor 121.

Returning the reader's attention to FIG. 1, central office terminal data set 126 is a well-known 9600 bps limited distance data set also commonly referred to as a multiplexer-demultiplexer. This limited distance data set is available from the Teltone Corporation and others and provides simultaneous and independent voice and data transmission in a full duplex mode complimentary to the customer terminal data set such as 124(1) interconnected through the line and trunk link networks. Having data carrier signal frequencies compatible with the customer premises terminal data set, office terminal data set 126 passes the data carrier signal from the interconnected host computer port data set such as 191 to the customer terminal data set via office computer port data set 127.

Office computer port data set 127 is a well-known and commercially available direct distance dialing (DDD) network long haul modem such as the 212A(1200 bps) or 2224A(2400 bps) data sets available from AT&T Information Systems. Data set 127 is connected to trunk link network 105 via a data signal line such as 154(1) through an incoming trunk circuit such as 109(1). Conductor pair 171 from outgoing trunk circuit 125 is connected to the office computer port data set to generate an off-hook seizure signal to incoming trunk circuit 109(1).

Data signal line 154(1) and communication line 156 are interconnected by trunk link network 105 in response to a network control signal from control unit 114. Outgoing trunk circuit 110 controls and detects the state of communication line 156 to host computer port data set 191 and host computer port 195. Switching system 190 interconnects communication line 156 and data signal line 179 to computer port data set (direct distance dialing modem) 191. Trunk 110 is controlled by control unit 114 via distributor 121 and reports changes of state to control unit 114 via scanner 120.

Similar to switched data signal line interface units 107(1)–107(n), each of dedicated data signal line interface units 108(1)–108(p) such as interface unit 108(1) transfers a voice signal between the voice signal line 153(1) in the pair of coupled lines and an interconnected simultaneous voice and data signals line such as 157(m) and also a data signal between data signal line 155(1) in the pair of coupled lines and interconnected simultaneous voice and data signals line 157(m). Each of dedicated data signal line interface units 108(1)–108(p) comprises an outgoing trunk circuit 130 and a central office terminal data set 131 similar to 126. Having data carrier signal frequencies compatible with the customer premises terminal data set such as 124(m), central office terminal data set (multiplexer-demultiplexer) 131 multiplexes and demultiplexes the voice and data signals transferred between interconnected simultaneous voice and data signals line 157(m) and the coupled pair of individual voice and individual data signal lines 153(1) and 155(1).

Like central office terminal data set 126, central office terminal data set 131 connects to a central office computer port data set such as 135(1) via a well-known RS232C interface such as interface 180. Central office computer port data set 135(1) terminates one end of data signal line 155(1), whereas a compatible host computer port data set 136(1) terminates the other end of line 155(1) and connects to host computer port 102(1). Depending on the distance between a group of host computer ports and a group of dedicated data signal line interface units, central office and host computer port data sets may be well-known limited distance data sets or long haul modems. When there is a large number of channels between the host computer ports and interface units, a digital multiplex system may be substituted for the central office and host computer port data sets. Central office terminal data set 131 connects to individual voice signal line 153(1) and simultaneous voice and data signals line 159(1) via outgoing trunk circuit 130.

Outgoing trunk circuit 130 is identical to outgoing trunk circuit 125 with the exception of relay 209 and the utilization of ferrod scan point 208. The host computer port data set such as 136(1) normally sends a data carrier signal to office computer port data set 135(1). This causes ferrod scan point 208 to be unsaturated. When the data carrier signal from the host computer port data set is absent, ferrod scan point 208 saturates indicating a fault condition. Since interface unit 108(1) is dedicated to data signal line 155(1), neither a supervisory seizure signal nor a control lead to central office computer port data set 135(1) is required. Control unit 114 controls each of interface units 108(1)-108(p) via distributor 121 and scanner 119.

Figure 3:
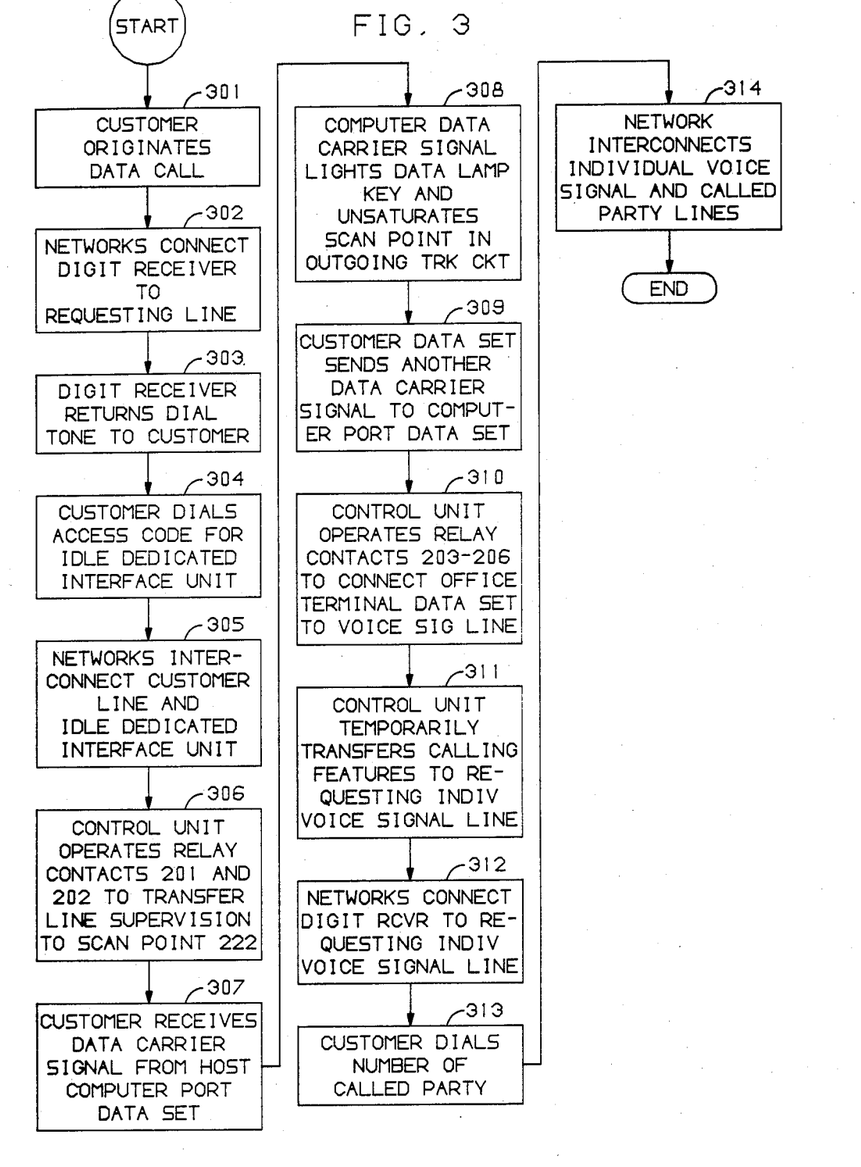
FIG. 3 illustrates the steps involved in making separate voice and data calls where each port of a host computer is dedicated to an interface unit in the switching system of FIG. 1.
Figure 4:
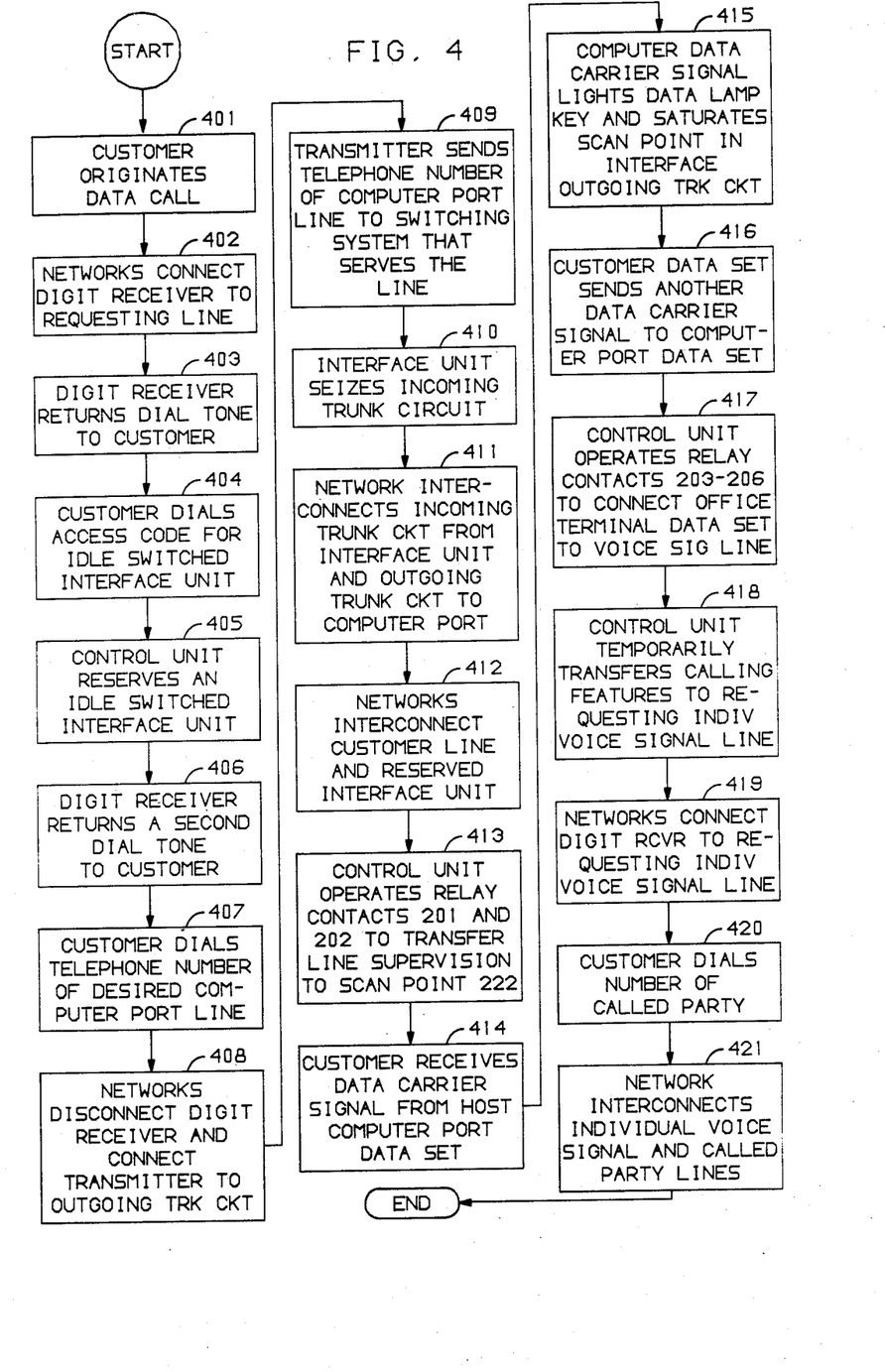
FIG. 4 illustrates the steps in making separate voice and data calls where each port of a host computer is selectively switched to the data signal line of an interface unit in the switching system of FIG. 1.

The operation of switching system 100 for pooling a predetermined number of pairs of individual voice and individual data signal lines to serve a greater number of simultaneous voice and data signals lines such as 157(1)-157(m) is illustrated in the flow diagrams of FIGS. 3 and 4. FIG. 3 illustrates the steps involved in making separate voice and data calls where each port of a host computer is dedicated to the data signal line of an interface unit in a pool of interface units such as 108(1)-108(p). FIG. 4 illustrates the steps in making separate voice and data calls where each port of a host computer is selectively switched to the data signal line of an interface unit in a pool of interface units such as 107(1)-107(n).

In the case where the data signal lines of the interface units in the switching system are dedicated to computer ports, let it be assumed that the customer at customer terminal equipment 103(m) desires to make a data call to an idle one of computer ports 102(1)-102(p) and to make a separate voice call to another party. Since customer terminal equipment 103(m) includes customer terminal data set 124(m) for simultaneously and independently transferring voice signal and data signals on single two-wire line 157(m), the customer originates the data call by lifting the receiver and going off hook at telephone 122(m) (FIG. 3, block 301). Control unit 114 detects this request for service via scanner 117 and generates control signals for the networks to connect a digit receiver such as 111 to requesting communication line 157(m) (block 302). Digit receiver 111 returns dial tone to the customer (block 303), and the customer at telephone 122(m) dials a predetermined access code for an idle dedicated data signal line interface unit (block 304). Control unit 114 receives the customer dialed access code from digit receiver 111 via scanner 119 and then generates a network control signal to networks 104 and 105 to connect communication line 157(m) to an idle dedicated data signal line interface unit such as 108(1)(block 305). In addition, control unit 114 generates another network control signal to networks 104 and 105 to disconnect the digit receiver from the customer line. The control unit also operates "make" relay contacts 201 and 202 in outgoing trunk circuit 130 via distributor 121 to transfer line supervision to scan point 222 (block 306). As a result, customer terminal data set 124(m) receives a data carrier signal from office terminal data set 131 in response to a data carrier signal from host computer port data set 136(1)(block 307).

The data carrier signal from office terminal data set 131 lights a data lamp key at customer terminal data set 124(m) unsaturating scan point 208 in outgoing trunk circuit 130 (block 308). When scan point 208 is saturated, this indicates a fault condition to control unit 114.

When the data lamp key at customer premises terminal data set 124(m) is lighted, the customer depresses the data lamp key to send another data carrier signal at a different frequency to office terminal data set 131 and host computer port data set 136(1) and to saturate scan point 207 in outgoing trunk 130 (block 309). The data call between data terminal 123(m) and computer port 102(1) is now established.

With the data call established and scan point 207 saturated, control unit 114 operates "make" and "break" relay contacts 203-206 disconnecting scan point 222 and connecting central office terminal data set 131 to individual voice signal line 153(1)(block 310). Supervision of individual voice signal communication line 153(1) is transferred to the ferrod scan point associated with the voice signal line at line link network 104. When the customer at telephone 122(m) hangs up his receiver and goes on hook, telephone 122(m) can receive and answer voice calls from calling parties.

When the customer at telephone 122(m) remains off hook to originate a separate voice call to a called party, control unit 114 performs a well-known temporary recent change operation to transfer the custom calling features of customer communication line 157(m) to requesting individual voice signal line, 153(1) (block 311). Control unit 114 senses this request for service at individual voice signal line 153(1) via scanner 117 and connects a digit receiver such as 111 to requesting voice signal line 153(1) (block 312). With the receipt of a second dial tone, the customer dials routing information such as the telephone number of called party telephone 151(r)(block 313). In a well-known manner after ringing and answer supervision has been detected, control unit 114 generates another control signal to line link network 104 to interconnect individual voice signal line 153(1) and called party line 151(r) via junctor circuit 113(block 314). Thus, simultaneous and independent voice and data calls are established over a single two-wire line from customer terminal equipment 103(m) to voice signal line 151(r) and data signal line 155(1) through the switching system.

When the customer at customer terminal equipment 103(m) terminates the data call to host computer port 102(1), control unit 114 sends control signals to the networks to disconnect interface unit 108(1) and to reconnect the voice call between customer line 157(m) and called party line 151(r) directly through line link network 104 and another junctor circuit.

In the case where the data signal line of an interface unit is selectively switched to a computer port, let it be assumed that the customer at customer terminal equipment 103(1) desires to make a data call to computer port 195 served by switching system 190 and also a separate voice call to a called party at telephone 101(1). Similar to the steps involved with making separate voice and data calls involving computer ports 102(1)-102(p) that are dedicated to the data signal lines of interface units 108(1)-108(p), the customer at customer equipment terminal 103(1) originates a data call by lifting his receiver and going off hook at telephone 122(1)(FIG. 4, block 401). Control unit 114 detects this request for service and generates a network control signal to networks 104 and 105. In response, networks 104 and 105 connect a digit receiver such as 111 to requesting communication line 157(1) (block 402). The digit receiver returns dial tone to the customer (block 403), and the customer dials a predetermined access code for an idle switched data signal line interface unit (block 404).

In response to the customer dialed access code, control unit 114 reserves a idle switched data signal line interface unit such as 107(1)(block 405) and causes digit receiver 111 to return a second dial tone to the customer at telephone 122(1)(block 406). The customer dials routing information such as the telephone number of desired computer port line 179 served by switching system 190 (block 407). The control unit generates control signals for networks 104 and 105 to disconnect digit receiver 111 from line 157(1) and for network 105 to connect a transmitter such as 194 to communication line 156 and outgoing trunk circuit 110 (block 408). Transmitter 111 then sends the telephone number of host computer port line 179 to switching system 190 that serves the line (block 409). The steps of connecting a digit transmitter and sending the telephone number of the computer port can be eliminated if the data call is intraoffice such as to host computer port line 170.

After the telephone number has been successfully sent to switching system 190, control unit 114 operates relay 209 of interface unit 107(1) to cause office computer port data set 127 to send a supervisory seizure signal to incoming trunk circuit 109(1)(block 410). Incoming trunk circuit 109(1) reports this seizure to control unit 114 via scanner 120, and the control unit generates a control signal for network 105 to interconnect data signal line 154(1) from incoming trunk circuit 109(1) and communication line 156 to outgoing trunk circuit 110 and computer port 195 (block 411).

After network 105 interconnects the incoming and outgoing trunk circuits, control unit 114 generates control signals for the networks to interconnect customer line 157(1) and reserved interface unit 107(1)(block 412). The control unit also operates "make" relay contacts 201 and 202 of outgoing trunk circuit 125 to transfer line supervision to scan point 222(block 413). As a result, customer terminal data set 124(1) receives a data carrier signal from office terminal data set 131 in response to a data carrier signal from host computer port data set 191(block 414). The data carrier signal from office terminal data set 126 lights a data lamp key at customer terminal data set 124(1) and saturates scan point 208 in outgoing trunk circuit 125(block 415). As previously described, the saturation of scan point 208 indicates to control unit 114 that a data carrier signal from host computer port data set 191 is being transmitted.

When the data lamp key at customer premises terminal data set 124(1) is lighted, the customer depresses the data lamp key to send another data carrier signal at a frequency different from that of the office terminal data set data carrier signal and to saturate scan point 207 in outgoing trunk circuit 125(block 416). The data call between data terminal 123(1) and host computer port 195 is now established.

In response to the saturation of scan point 207, control unit 114 operates "make" and "break" relay contacts 203–206 disconnecting scan point 222 from and connecting central office terminal data set 126 to individual voice signal line 152(1)(block 417). Supervision of voice signal line 152(1) is transferred to the ferrod scan point associated with the individual voice signal line at line link network 104.

When the customer at telephone 122(1) remains off hook to complete a separate voice call to another party, control unit 114 performs a well-known temporary recent change operation to transfer the custom calling features of customer communication line 157(1) to requesting individual voice signal line 152(1)(block 418). Control unit 114 senses this request for service at individual voice signal line 152(1) and generates control signals for the networks to connect a digit receiver such as 111 to requesting individual voice signal line 152(1)(block 419). The digit receiver returns dial tone to the customer, and the customer dials routing information such as the telephone number of called party telephone 151(1)(block 420). After ringing and answer supervision has been detected, control unit 114 generates a control signal to network 104 to interconnect individual voice signal lines 151(1) and called party line 152(1) via junctor circuit 112(block 421). Thus, once again, simultaneous and independent voice and data calls are established over a single two-wire line from customer terminal equipment 103(1) to separate voice signal line 151(1) and data signal line 172 through switching system 100.

When the customer at customer terminal equipment 103(1) terminates the data call to computer port 195, control unit 114 generates control signals for the networks to disconnect interface unit 107(1) and to reconnect the voice call between customer line 157(1) and called party line 151(1) directly through line link network 104 and another junctor circuit. Control unit 114 performs another temporary recent change to restore the custom calling features to customer line 157(1). When the customer terminates the voice call, switching system 101 disconnects the calling and called parties in a well-known manner.

After a data call has been established, the customer may hang up his receiver and go on hook to receive voice calls from calling parties.

What is claimed is:

1. For use with a first, a second, and a third plurality of communication lines and pairs of communication lines, each of said first plurality of lines for transferring a voice signal thereon, each of said second plurality of lines for transferring a data signal thereon, each of said third plurality of lines for simultaneously transferring a voice signal and a data signal thereon, each of said pairs of lines comprising a voice signal line in said first plurality of lines and a data signal line in said second plurality of lines, the number of simultaneous voice and data signals lines in said third plurality of lines being greater than the number of said pairs of lines, a switching system for pooling said pairs of individual voice and individual data signal lines to serve said third plurality of simultaneous voice and data signals lines, comprising:

a plurality of interface units each for transferring a voice signal between the voice signal line in a pair of said pairs of lines coupled thereto and a simultaneous voice and data signals line in said third plurality of lines and a data signal between the data signal line in the pair of lines coupled thereto and the simultaneous voice and data signals line in said third plurality of lines, and a switching network for interconnecting an interface unit in said plurality of interface units and a simultaneous voice and data signals line in said third plurality of times requesting service and further interconnecting the voice signal line in the pair of lines coupled to said interconnected interface unit and another voice signal line in said first plurality of lines.

2. The system of claim 1 wherein each of said interface units has an access code, wherein said system further comprises a control unit responsive to an access code received from said requesting simultaneous voice and data signals line for generating a control signal, and wherein said network is responsive to said control signal for interconnecting said requesting simultaneous voice and data signals line and an interface unit in said plurality of interface units having said received access code.

3. The system of claim 2 wherein said control unit is further responsive to routing information received from said requesting simultaneous voice and data signals line for generating a second control signal and wherein said network is further responsive to said second control signal for interconnecting the voice signal line in the pair of lines coupled to said interconnected interface unit and said other voice signal line in said first plurality of lines indicated by said routing information.

4. The system of claim 2 wherein said interconnected interface unit includes a multiplexer for transferring the voice signal between said interconnected requesting simultaneous voice and data signals line and the voice signal line in the pair of lines coupled to said interconnected interface unit and the data signal between said interconnected requesting simultaneous voice and data signals line and the data signal line in the pair of lines coupled to said interconnected interface unit.

5. The system of claim 4 wherein said interconnected interface unit further includes means for interconnecting said multiplexer and said interconnected requesting simultaneous voice and data signals line.

6. The system of claim 4 wherein said interconnected interface unit further includes means for interconnecting said multiplexer and the voice signal line in the pair of lines coupled to said interconnected interface unit.

7. The system of claim 2 wherein the data signal line in the pair of lines coupled to said interconnected interface unit has a plurality of states and wherein said interconnected interface unit includes means interrogatable by said control unit for detecting the state of the data signal line in the pair of lines coupled to said interconnected interface unit.

8. The system of claim 2 wherein the voice signal line in the pair of lines coupled to said interconnected interface unit has a plurality of states and wherein said interconnected interface unit includes means interrogatable by said control unit for detecting the state of the voice signal line in the pair of lines coupled to said interconnected interface unit.

9. The system of claim 2 wherein said control unit is further responsive to routing information received from said requesting simultaneous voice and data signals line for generating a second control signal and wherein said network is responsive to said second control signal for interconnecting the data signal line in the pair of lines coupled to said interface unit having said received access code and another data signal line in said second plurality of lines indicated by said routing information.

10. The system of claim 9 wherein said control unit is further responsive to said routing information received from said requesting simultaneous voice and data signals line for generating a service request signal and wherein said interconnected interface unit having said received access code includes means responsive to said service request signal for requesting service on the data signal line in the pair of lines coupled to said interconnected interface unit having said received access code.

11. The system of claim 9 wherein said interconnected interface unit having said received access code includes a multiplexer for transferring the voice signal between the voice signal line in the pair of lines coupled to said interconnected interface unit having said received access code and said interconnected requesting simultaneous voice and data signals line and the data signal between the data signal line in the pair of lines coupled to said interconnected interface unit having said received access code and said requesting simultaneous voice and data signals line.

12. The system of claim 11 wherein said interconnected interface unit having said received access code further includes means for interconnecting said multiplexer and said interconnected requesting simultaneous voice and data signals line.

13. The system of claim 12 wherein said interconnected interface unit having said received access code further includes means for interconnecting said multiplexer and the voice signal line in the pair of lines coupled to said interconnected interface unit having said received access code.

14. The system of claim 9 wherein the data signal line in the pair of lines coupled to said interconnected interface unit having said received access code has a plurality of states and wherein said interconnected interface unit having said received access code includes means interrogatable by said control unit for detecting the state of the data signal line in the pair of lines coupled to said interconnected interface unit having said received access code.

15. The system of claim 9 wherein the voice signal line in the pair of lines coupled to said interconnected interface unit having said received access code has a plurality of states and wherein said interconnected interface unit having said received access code includes means interrogatable by said control unit for detecting the state of the voice signal line in the pair of lines coupled to said interconnected interface unit having said received access code.

16. The system of claim 9 wherein said control unit is further responsive to second routing information received from said interconnected requesting simultaneous voice and data signals line for generating a third control signal and wherein said network is further responsive to said third control signal for interconnecting the voice signal line in the pair of lines coupled to said interconnected interface unit having said received access code and another voice signal line in said first plurality of lines indicated by said second routing information.

17. For use with a switching system serving a first, a second, and a third plurality of communication lines, each of said first plurality of lines for transferring a voice signal thereon, each of said second plurality of lines for transferring a data signal thereon, each of said third plurality of lines for simultaneously transferring a voice signal and a data signal thereon, certain of the voice signal lines in said first plurality of lines each having a data signal line in said second plurality of lines to form a pair of individual voice and individual data signal lines, an interface unit for simultaneously transferring a voice and a data signal between a simultaneous voice and data signals line and a pair of individual voice and individual data signal lines, comprising:
- a multiplexer for transferring a voice signal between the voice signal line in said pair of lines and said simultaneous voice and data signals line and a data signal between the data signal line in said pair of lines and said simultaneous voice and data signals line, and
- a circuit for interconnecting said multiplexer and said simultaneous voice and data signals line.

18. The unit of claim 17 wherein the voice signal line in said pair of lines has a plurality of states and wherein said interface unit further includes means for detecting the state of the voice signal line in said pair of lines.

19. The unit of claim 17 wherein the data signal line in said pair of lines has a plurality of states and wherein said interface unit further includes means for detecting the state of the data signal line in said pair of lines.

20. The unit of claim 17 wherein said interface unit further includes means for interconnecting said multiplexer and the voice signal line in said pair of lines.

21. The unit of claim 17 wherein said interface unit further includes means for interconnecting the data signal line in said pair of individual lines and another data signal line in said second plurality of lines.

22. The switching system of claim 1 wherein said switching network comprises means for interconnecting said interface unit in said plurality of interface units and the simultaneous voice and data signals in said third plurality of lines requesting service and means for interconnecting the voice signal line in the pair of lines coupled to said interconnected interface unit and the other voice signal line in said first plurality of lines.

* * * * *